(12) United States Patent
Bond

(10) Patent No.: US 11,366,035 B2
(45) Date of Patent: *Jun. 21, 2022

(54) SYSTEM AND METHOD FOR REDUCING THERMAL OFFSET IN A PRESSURE GAUGE

(71) Applicant: Anderson Instrument Co., Inc., Fultonville, NY (US)

(72) Inventor: Richard J. Bond, Pattersonville, NY (US)

(73) Assignee: ANDERSON INSTRUMENT CO., INC., Fultonville, NY (US)

(*) Notice: Subject to any disclaimer, the term of this patent is extended or adjusted under 35 U.S.C. 154(b) by 262 days.

This patent is subject to a terminal disclaimer.

(21) Appl. No.: 16/653,674

(22) Filed: Oct. 15, 2019

(65) Prior Publication Data

US 2021/0108982 A1 Apr. 15, 2021

(51) Int. Cl.
  *G01L 19/04* (2006.01)
  *G01L 7/04* (2006.01)
  *G01L 7/08* (2006.01)

(52) U.S. Cl.
  CPC ............. *G01L 19/04* (2013.01); *G01L 7/04* (2013.01); *G01L 7/08* (2013.01)

(58) Field of Classification Search
  CPC ... G01L 3/24; G01L 3/242; G01L 5/08; G01L 5/10; G01L 5/101; G01L 5/108; G01L 5/16; G01L 5/1627; G01L 5/167; G01L 5/22; G01L 5/28; G01L 23/085; G01L 23/20; G01L 5/0061; G01L 5/0071; G01L 5/008; G01L 5/06; G01L 5/171; G01L 7/106

USPC .................................................. 73/700–756
See application file for complete search history.

(56) References Cited

U.S. PATENT DOCUMENTS

| | | | |
|---|---|---|---|
| 3,550,609 A | * | 12/1970 | Roche .................... G01L 7/048 137/83 |
| 3,789,668 A | | 2/1974 | Bissell |
| 3,857,219 A | | 12/1974 | Bissell |
| 3,934,479 A | * | 1/1976 | Posnansky ............... G01K 5/48 374/197 |
| 3,990,309 A | * | 11/1976 | Beckwith ............... G01L 7/048 73/708 |
| 4,040,298 A | | 8/1977 | Lee et al. |
| 4,399,706 A | | 8/1983 | List et al. |

(Continued)

*Primary Examiner* — Andre J Allen
(74) *Attorney, Agent, or Firm* — Seed Intellectual Property Law Group LLP

(57) ABSTRACT

A pressure measurement device is provided. The pressure measurement device includes a pressure gauge having a hermetically sealed cavity. The cavity includes a pressure transferring media. The materials chosen for both the pressure gauge and the pressure transferring media are selected so that thermal effects on the pressure measurement device are minimized. The pressure transferring media includes a first material and a second material. The material for the pressure gauge and the materials for the pressure transferring media, in particular the first material and the second material, may be selected so that the volume of the pressure transferring media substantially fills the volume of the cavity of the pressure gauge within a particular temperature range. The pressure measurement device includes a pressure reading mechanism coupled to the pressure gauge and operative to convert a displacement of the pressure gauge to a pressure measurement reading.

21 Claims, 3 Drawing Sheets

(56) References Cited

U.S. PATENT DOCUMENTS

| | | | |
|---|---|---|---|
| 4,501,152 A * | 2/1985 | Wetterhorn | G01L 19/14 73/431 |
| 4,682,501 A * | 7/1987 | Walker | G01L 7/048 374/143 |
| 5,877,426 A | 3/1999 | Hay et al. | |
| 5,895,861 A * | 4/1999 | Slonaker | G01L 19/16 73/732 |
| 6,578,429 B1 | 6/2003 | Danna et al. | |
| 10,288,514 B2 | 5/2019 | Bond et al. | |
| 2004/0159157 A1 | 8/2004 | Sherman et al. | |
| 2013/0055820 A1* | 3/2013 | Bourbeau | G01L 19/04 |
| 2014/0238143 A1 | 8/2014 | Beck | |
| 2017/0059436 A1* | 3/2017 | Bauer | G01L 19/12 |

\* cited by examiner

SYSTEM AND METHOD FOR REDUCING THERMAL OFFSET IN A PRESSURE GAUGE

BACKGROUND

Technical Field

This application is directed to a pressure gauge and, in particular, a process isolated pressure gauge that mitigates thermal offset in pressure measurements.

Description of the Related Art

Conventional sealed pressure gauges are susceptible to thermal variations. In particular, variations in temperature of a conventional sealed pressure gauge can introduce a thermal offset in the pressure measurements being made by the pressure gauge. The thermal offset is a function of the temperature change to which the pressure gauge is exposed. Thus, as environmental, or process, temperatures fluctuate, the thermal offset of the pressure gauge also fluctuates. Due to these thermal offsets, conventional sealed pressure gauges may provide incorrect and flawed pressure measurements.

BRIEF SUMMARY

In at least one embodiment, a pressure measurement device includes a C-shaped Bourdon tube having a distal end and a proximal end having an open inlet. An interior of the C-shaped Bourdon tube forms a cavity. The cavity expands and contracts in response to the C-shaped Bourdon tube changing in temperature. A pressure transferring media is in the cavity. The pressure transferring media includes a liquid and a compensation material. The compensation material is selected to cause the pressure transferring media to expand and contract in response to changes in temperature at substantially similar rates as the cavity expands and contract.

In an embodiment, the pressure measurement device includes a membrane that covers the open inlet. The membrane has a first surface exposed to the cavity of the C-shaped Bourdon tube and a second surface opposite the first surface that is exposed to an environment outside of the C-shaped Bourdon tube. In an embodiment, the pressure measurement device includes a pressure reading mechanism coupled to the distal end of the C-shaped Bourdon tube and operative to convert displacement of the membrane, such as the distal end of the membrane, to a pressure measurement reading.

In an embodiment, the liquid occupies 10%-30% of the volume of the cavity and the compensator material occupies a remaining volume of the cavity. In another embodiment, the liquid occupies 10%-20% of the volume of the cavity and the compensator material occupies a remaining volume of the cavity. In an embodiment, the compensator material is at least one of a ceramic, glass, Garolite®, Invar™, plastics, and graphite. In an embodiment, the pressure reading mechanism is a mechanical mechanism or an electronic mechanism. In an embodiment, the liquid is any flowable material. In at least one embodiment, the liquid is for use in sanitary situations and is at least one of silicone, mineral oil and water.

In at least one embodiment, the cavity and the pressure transferring media expands and contract at substantially similar rates over a particular temperature range. In one embodiment, the particular temperature range is between −50° F. and 400° F. In other embodiments, the particular temperature range is between −30° F. and 225° F. or between 0° F. and 150° F.

In some embodiments, the C-shaped Bourdon tube is made of metal and the first material of the pressure transferring media is a liquid, such as silicone, oil, or water. Metal has a lower coefficient of thermal expansion than such liquids. Thus, the coefficient of thermal expansion of the compensation material is less than the coefficient of thermal expansion of the liquid. For instance, the compensation material may be a material, such as Garolite®, ceramic, glass, Invar™, or graphite.

In another embodiment, the C-shaped Bourdon tube is made of plastic, which has a higher coefficient of thermal expansion than the above-mentioned liquids. Therefore, in this embodiment, the coefficient of thermal expansion of the compensation material is greater than the coefficient of thermal expansion of the liquid. For instance, the compensation material may be a composite material, such as plastic having a greater coefficient of thermal expansion than the plastic used for forming the Bourdon tube.

In at least one embodiment, a pressure measurement device includes a pressure gauge having a cavity. The pressure gauge is made of a material having a first coefficient of thermal expansion. A pressure transferring media is in the cavity. The first and second materials together have an overall coefficient of thermal expansion that substantially corresponds to the first coefficient of thermal expansion. The pressure measurement device includes a pressure reading mechanism coupled to the pressure gauge and operative to convert a displacement of the pressure gauge to a pressure measurement reading.

In at least one embodiment, the overall coefficient of thermal expansion substantially corresponds to the first coefficient of thermal expansion of material of the pressure gauge when the overall coefficient of thermal expansion is within 20% of the first coefficient of thermal expansion. In another embodiment, the overall coefficient of thermal expansion substantially corresponds to the first coefficient of thermal expansion of material of the pressure gauge when the overall coefficient of thermal expansion is within 10% of the first coefficient of thermal expansion.

In an embodiment, the pressure measurement device includes an inlet in the pressure gauge and a membrane positioned to cover the inlet. In an embodiment, the membrane has a first surface exposed to the cavity and a second surface opposite the first surface that is exposed to an environment outside of the cavity. In an embodiment, the inlet is operative to convey a pressure of the environment to the pressure transferring media.

In an embodiment, the pressure gauge is at least one of a C-shaped Bourdon tube, a helix, bellows and a diaphragm. In an embodiment, a volume of the compensator material is 70%-90% of the volume of the pressure transferring media and a volume of the fluid is a remaining volume of the pressure transferring media. In an embodiment, the volume of the compensator material is 80%-90% of the volume of the pressure transferring media and the compensator material occupies a remaining volume of the cavity. In an embodiment, the compensator material is at least one of a ceramic, glass, Garolite®, Invar™, plastics and graphite. In an embodiment, the fluid is at least one of silicone, mineral oil and water.

In one embodiment, the first material has a second coefficient of thermal expansion and the second material has a third coefficient of thermal expansion. The third coefficient of thermal expansion is less than both the second coefficient of thermal expansion and the first coefficient of thermal expansion. In another embodiment, the third coefficient of thermal expansion is greater than both the second coefficient of thermal expansion and the first coefficient of thermal expansion.

In one embodiment, the pressure gauge is made of a metal material, the first material is a liquid, such as silicone, mineral oil, or water, and the second material is ceramic, glass, graphite, Garolite®, or Invar™.

In an embodiment, a pressure measurement device includes a pressure gauge having a hermetically sealed cavity. The pressure gauge is made of a material having a coefficient of thermal expansion. A pressure transferring media is in the cavity. The pressure transferring media includes a first material and a second material. The first material and the second material have an overall coefficient of thermal expansion that substantially corresponds to the coefficient of thermal expansion of the pressure gauge, such that the pressure transferring media expand and contract in volume at substantially similar rates as the cavity expands and contracts in volume in response to changes in temperature over a particular temperature range. The pressure measurement device includes a pressure reading mechanism coupled to the pressure gauge and operative to convert a displacement of the pressure gauge to a pressure measurement reading.

In at least one embodiment, substantially similar rates are rates within 10% of each other. In at least one embodiment, the overall coefficient of thermal expansion is determined based on the materials and the volume of the material used for the flowable material and the solid material.

In at least one embodiment, the coefficients of thermal expansion of the material of the pressure gauge and the second material are greater than a coefficient of thermal expansion of the first material.

In another embodiment, the coefficients of thermal expansion of the material of the pressure gauge and the second material are less than a coefficient of thermal expansion of the first material.

In an embodiment, the pressure measurement device includes an inlet in the pressure gauge and a membrane positioned to cover the inlet. The membrane has a first surface exposed to the cavity and a second surface opposite the first surface that is exposed to an environment outside the pressure gauge. The inlet is operative to convey a pressure of the environment to the pressure transferring media.

In an embodiment, the pressure gauge is at least one of a C-shaped Bourdon tube, a helix, a bellows and a diaphragm. In an embodiment, a volume of the compensator material is 70%-90% of the volume of the pressure transferring media and a volume of the flowable material is a remaining volume of the pressure transferring media. In an embodiment, the volume of the compensator material is 80%-90% of the volume of the pressure transferring media and the compensator material occupies a remaining volume of the cavity. In an embodiment, the compensator material is at least one of a ceramic, glass, Garolite®, Invar™, plastics, and graphite.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

DETAILED DESCRIPTION

Figure 1:
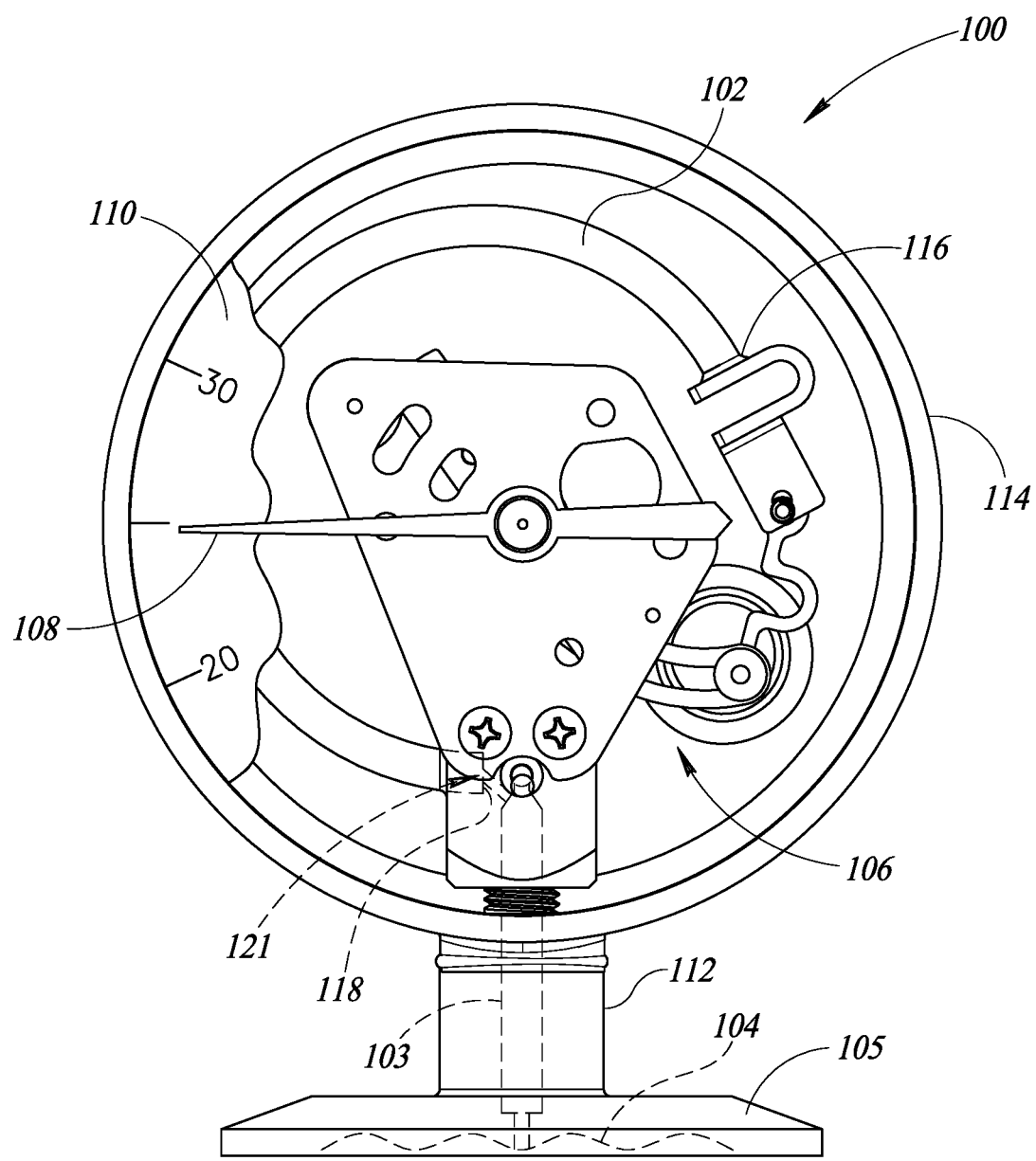
FIG. 1 is a schematic side view of a pressure measurement device in accordance with one embodiment.

FIG. 1 is a schematic illustration of a pressure measurement device 100. The pressure measurement device 100 includes a pressure gauge 102, a fill passage 103, a membrane 104, a connector 105, a pressure reading mechanism 106, a pressure indicator 108, a dial plate 110, a mount 112 and a housing 114. Although not shown in FIG. 1, the pressure measurement device 100 may also include a transparent cover for the pressure indicator 108 and the dial plate 110.

The pressure gauge 102 includes a C-shaped Bourdon tube that has a distal end 116 and a proximal end 118. The distal end 116 is configured to move relative to the proximal end 118 in response to a change in pressure, as will be explained in more detail below. The pressure gauge 102 may be any device that is configured to detect pressure, such as, pneumatic pressure or atmospheric pressure, or a change thereof and convert the detected pressure or change to a displacement. Although a C-shaped Bourdon tube is shown in FIG. 1, the pressure gauge may be other shapes or types, such as a U-shaped tube, a helix, a spiral, bellows or a diaphragm, among others.

The distal end 116 of the pressure gauge 102 is coupled to the pressure reading mechanism 106. The pressure reading mechanism 106 is, in turn, coupled to the pressure indicator 108. The proximal end 118 of the pressure gauge 102 has an inlet 121 to the fill passage 103 that is sealed and covered by the membrane 104. The pressure gauge 102, pressure reading mechanism 106, pressure indicator 108 and dial plate 110 may be positioned within the housing 114. The membrane 104 may be positioned within the connector 105, and the fill passage 103 may be positioned at least partly within the mount 112. The connector 105 may be used for joining or fitting the pressure measurement device 100 to another device or a process (such as an industrial process).

The pressure reading mechanism 106 detects a displacement of the pressure gauge 102, such as the distal end 116 of the pressure gauge 102, and causes the pressure indicator 108 to move. The pressure measurement device 100 is calibrated such that a pressure reading that is indicated on the dial plate 110 by the pressure indicator 108 corresponds to the pressure detected by the pressure gauge 102. Although a mechanical pressure reading mechanism is shown, it will be appreciated that the pressure reading mechanism 106 may be an electronic pressure reading mechanism.

Figure 2:
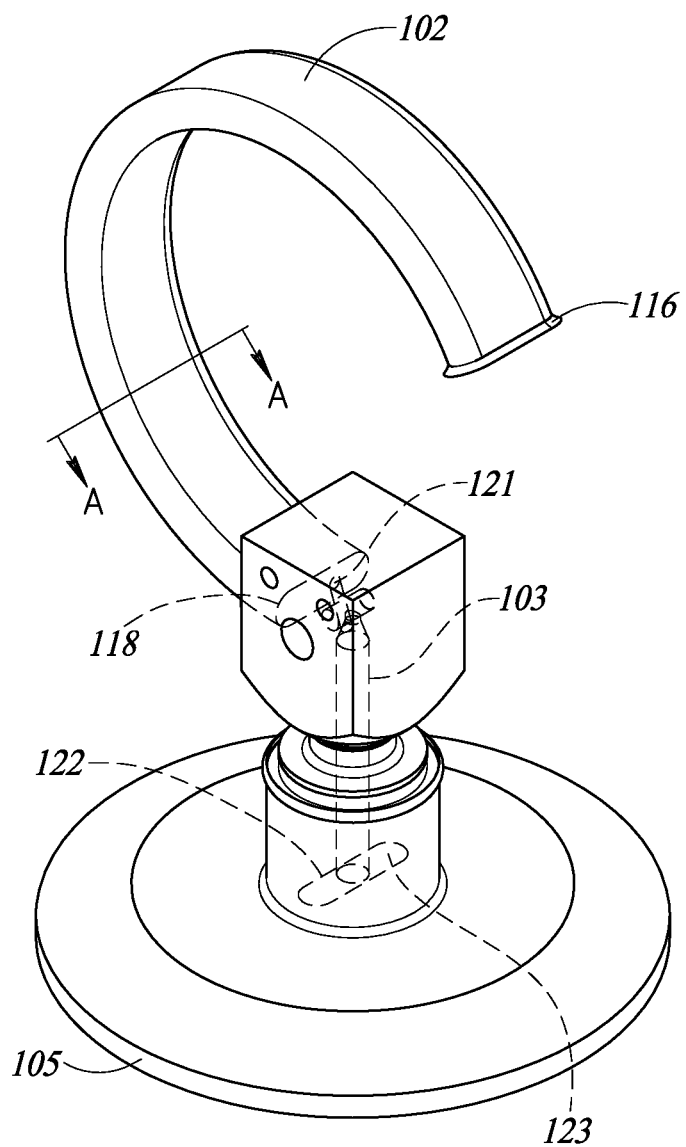
FIG. 2 is a schematic isometric view of the pressure gauge of FIG. 1 coupled to the membrane.
Figure 3:
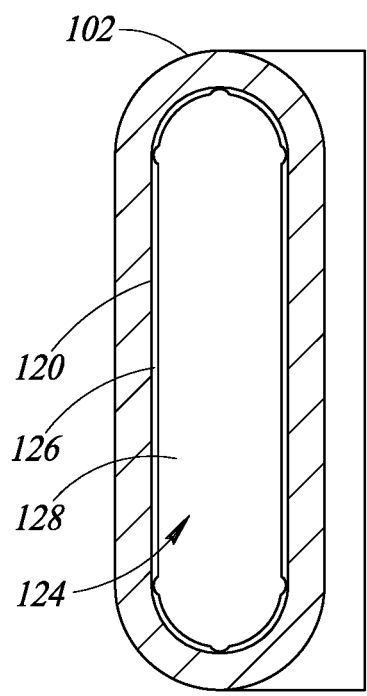
FIG. 3 is a schematic cross-sectional view of the pressure gauge of FIG. 2 taken through line A-A.

FIG. 2 depicts an isometric view of a schematic illustration of the pressure gauge 102 and the membrane 104 of FIG. 1. FIG. 3 is a cross-sectional view of the pressure gauge 102 taken through line A-A in FIG. 2. As best shown in FIG. 3, the pressure gauge 102 has a hollow interior that forms a cavity 120. The cavity 120 is hermetically sealed, or liquid sealed, and isolated from an environment (such as, a manufacturing process) outside of the pressure gauge 102. As used in this context, liquid sealed refers to a seal that is sufficient to prevent escape of a pressure transferring media 124 disposed within the cavity 120 and also prevents contamination of the pressure transferring media 124 from sources outside the cavity 120. As shown in FIG. 2, to enclose the cavity 120, the distal end 116 of the pressure gauge 102 is sealed. The proximal end 118, on the other hand, has an inlet 121 to the fill passage 103 that is covered and sealed by the membrane 104. As used in this context, a fill passage may include a structure formed to allow passage of the pressure transferring media 124 into the cavity 120 of the C-shaped Bourdon tube. In particular, a first surface 122 of the membrane 104 interfaces with the cavity 120, or more specifically the pressure transferring media 124, of the pressure gauge 102 via inlet 118. A second surface 123 of the membrane 104 that is opposite to the first surface 122 is exposed to an environment of which pressure is to be measured. The membrane 104 is configured to flex in response to pressure being applied to the first and second surfaces 122, 123. It will be appreciated that, in some embodiments or configurations, the pressure gauge may not include a fill passage. In such embodiments the membrane 104 may directly interface with the cavity 120 of the pressure gauge 102. As used in this context interfacing can refer to coupling, covering, aligning, connecting, interacting or other suitable interfacing.

Figure 4:
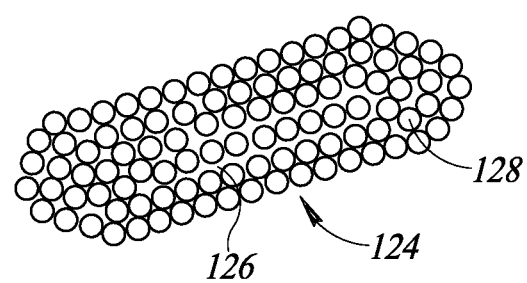
FIG. 4 is a schematic illustration of a pressure transferring media used in a pressure measurement device in accordance with one embodiment.

The cavity 120 of the pressure gauge 102 is filled with the pressure transferring media 124, which is shown in FIGS. 3 and 4. The pressure transferring media 124 transfers pressure from the membrane 104 to the pressure gauge 102. The pressure transferring media includes at least two materials, a first material 126 and a second material 128. The second material has a lower coefficient of thermal expansion than the first material.

The first material 126 is a flowable material or at least semi-flowable material, and in one embodiment is a liquid, such as, for example, water or mineral oil. In another embodiment, the first material 126 is silicone. It will be appreciated by a person of ordinary skill in the art that other liquids can be utilized in place of the illustrative liquids mentioned above. These other liquids are expressly contemplated herein and the example liquids mentioned herein are merely intended to be illustrative of possible liquids. When placed in the cavity 120, the first material 126 may freely flow therein and reposition during displacement of the pressure gauge 102.

The second material 128 is a compensator material that, by virtue of having a lower coefficient of thermal expansion than the first material, reduces an overall coefficient of thermal expansion of the pressure transferring media 124 to be below the first coefficient of thermal expansion. Advantageously, the second material 128 is a compensation material that is configured to temper, or reduce, the deformation or displacement of the pressure gauge 102 in response to changes in temperature. Consequently, more accurate pressure measurement readings may be provided. The second material 128 is also referred to herein as compensator material 128.

The compensator material 128 may any type of material that has a lower coefficient of thermal expansion than the first material 126, thereby decreasing the overall coefficient of thermal expansion of the pressure transferring media 124. In some embodiments, the compensator material 128 can have a coefficient of thermal expansion that is less than 60% of the coefficient of thermal expansion of the first material 126, and in some cases less than 40% of the coefficient of thermal expansion of the first material 126. It will be appreciated that the coefficient of thermal expansion of the compensator material can be selected based upon, for example, the intended use (e.g., process, environment, etc.) of the pressure gauge 102. The compensator material 128 may include, but is not limited to ceramics, glass, Garolite®, Invar, plastic or graphite, any other material having a coefficient of thermal expansion that is less than the first material, or any combination of these materials. Additional example compensator materials 128 include diamond or quartz that are associated with a relatively low coefficient of thermal expansion and are alternatives that may be used. In various embodiments, the compensator material 128 may be a solid or semi-solid having any shape. For example, the compensator material 128 may be beads, blocks or fibers, among others, that are disposed in the first material 126. In another embodiment, the compensator material may be flowable or semi-flowable.

As shown in FIG. 3, the compensator material 128 may be stacked in the cavity 120 of the pressure gauge 102 and the first material 126 may occupy an annulus on a periphery of the compensator material 128. In FIG. 4, where a suspended pressure transferring media 124 is shown, the compensator material 128 may be beads that are dispersed within the first material 126.

In one embodiment, the materials chosen for both the pressure gauge 102 and the pressure transferring media 124 are selected to mitigate thermal effects on the pressure measurement device 100. In particular, the material for the pressure gauge 102 and the material for the pressure transferring media, more particularly the first material 126 and the compensator material 128, are selected so that they expand and contract at substantially similar rates, e.g., such that the volume of the pressure transferring media 124 substantially fills the volume of the cavity 120 of the pressure gauge 102 over a particular temperature range. Thus, as the pressure gauge 102 itself expands and contracts due to changes in temperature, the cavity 120 formed by the hollow interior of the pressure gauge expands and contracts, and similarly, the pressure transferring media 124 expands and contracts at substantially similar rates within the particular temperature range.

In one embodiment, substantially fills includes pressure transferring media 124 substantially filling the volume of the cavity 120 at least to 90% over the temperature range. In another embodiment, substantially fills includes filling the volume of the cavity 120 at least to 95% over the temperature range. In yet another embodiment, substantially fills includes filling the volume of the cavity 120 at least to 98% over the temperature range.

For example, as the material of the pressure gauge 102 expands with increasing temperature, the volume of the cavity 120 that holds the pressure transferring media 124 also increases. Similarly, the volume of the pressure transferring media 124 also increases due to the increase in temperature such that the increased volume of the pressure transferring media 124 substantially fills the expanded cavity 120. Conversely, as the material of the pressure gauge 102 contracts with decreasing temperature, the volume of the cavity 120 decreases, while the volume of the pressure transferring media 124 also decreases.

The compensator material 128 may be selected based on a difference between a first rate of change in volume of the pressure gauge 102 and a second rate of change in volume of the first material 126 of the pressure transferring media 124. More particularly, the compensator material 128 may be selected to correspond to the difference between the first and second rates, such that the volume of the pressure transferring media 124 substantially corresponds to the volume of the pressure gauge 102 over the temperature range. That is, the first material 126 and the compensator material 128 are selected so that the combination of the two materials have an overall coefficient of thermal expansion that causes the pressure transferring media 124 to have a change in volume that more closely corresponds to a change in volume of the pressure gauge 102, than it would without the compensator material 128.

The overall coefficient of thermal expansion of the pressure transferring media 124 may be a weighted average of the first and second materials. In the weighted average, the first coefficient of thermal expansion is weighted or scaled by a proportion of a volume of the first material 126 to an overall volume of the pressure transferring media 124. The second coefficient of thermal expansion is weighted or scaled by a proportion of a volume of the second material 128 to an overall volume of the pressure transferring media 124.

Accordingly, the volume and type of material to be used as the first material 126 and compensator material 128 are considered to obtain the overall coefficient of thermal expansion that is desired for the pressure transferring media 124.

The overall coefficient of thermal expansion for the pressure transferring media 124 does not need to equal the coefficient of thermal expansion of the material of the pressure gauge 102. In one embodiment, the overall coefficient of thermal expansion substantially corresponds to the first coefficient of thermal expansion of material of the pressure gauge when the overall coefficient of thermal expansion is within 20% of the first coefficient of thermal expansion. In another embodiment, the overall coefficient of thermal expansion substantially corresponds to the first coefficient of thermal expansion of material of the pressure gauge when the overall coefficient of thermal expansion is within 10% of the first coefficient of thermal expansion.

In other embodiments, the overall coefficient of thermal expansion for the pressure transferring media 124 may be within a range of the coefficient of thermal expansion of the material of the pressure gauge 102 such that the pressure transferring media 124 substantially fills the cavity of the pressure gauge 102 over the temperature range. In some embodiments, substantially equal is within 10% of filling the pressure gauge 102 over the particular temperature range, while in other embodiments substantially equal is within 5%, and in one embodiment, substantially equal is within 3%.

The compensator material 128 may have a coefficient of thermal expansion that is higher or lower than the coefficient of thermal expansion of the first material 126. For example, in one embodiment, the material for the pressure gauge is a metal material, such as, for example, steel or silver, which has a relatively low coefficient of thermal expansion. The first material 126 is a liquid, such as water oil, such as mineral oil, or silicone. In general, these liquids have a higher coefficient of thermal expansion than metal materials. Thus, in this embodiment, the compensator material 128 is selected to have a lower coefficient of thermal expansion than the first material 126, to bring down the overall coefficient of thermal expansion for the pressure transferring media 124. In that regard, volumetric changes of the pressure transferring media 124 due to thermal changes more closely corresponds to volumetric changes of the cavity of the pressure gauge 102. The volume of the compensation material 128 is determined based on the desired overall coefficient of thermal expansion. For instance, the compensator material 128 may be a ceramic, glass, graphite, Garolite®. or Invar™.

In another embodiment, the material for the pressure gauge is a plastic material, such as a polymer, which has a relatively high coefficient of thermal expansion. The first material 126 is a liquid, such as water, oil, such as mineral oil, or silicone. In general, these liquids have a lower coefficient of thermal expansion than plastic materials. Thus, in this embodiment the compensator material 128 is selected to also have a relatively high coefficient of thermal expansion to increase the an overall coefficient of thermal expansion for the pressure transferring media 124 so that volumetric changes of the pressure transferring media 124 due to thermal changes more closely corresponds to volumetric changes of the cavity. In particular, the compensator material 128 is selected to have a coefficient of thermal expansion that is higher than the coefficient of thermal expansion of the liquid. The volume of the compensation material 128 is determined based on the desired overall coefficient of thermal expansion. For instance, the compensator material 128 may be a plastic having a higher coefficient of thermal expansion than the plastic material used to form the pressure gauge.

The temperature range may be the operating range for the pressure gauge 102. In one embodiment, the temperature range is from −50° F. to 400° F., in another embodiment, the temperature range is from −30° F. to 225° F., and in yet another embodiment, the temperature range is from 0° F. to 150° F.

In operation, pressure of the environment is transferred from the membrane 104 to the pressure gauge 102. When the pressure measurement device 100 is exposed to an environment of increased pressure, the membrane 104 flexes toward the cavity 120 of the pressure gauge 102, thereby applying pressure to the pressure transferring media 124 thereby causing the pressure gauge 102 to deform and experience a displacement. That is, the distal end 116 of the pressure gauge 102 is displaced (e.g., uncoiled). The pressure reading mechanism 106 detects the displacement of the pressure gauge 102 and converts the displacement to a pressure measurement as described with reference to FIG. 1. When the pressure at the membrane 104 is relieved, the tube will be induced to retreat to its original form.

Conversely, as the pressure measurement device 100 is exposed to an environment of decreased pressure, the membrane 104 flexes away from the cavity 120 of the pressure gauge 102, thereby releasing pressure on the pressure transferring media 124. In response to the release of the pressure transferring media 124, the distal end 116 of the pressure gauge 102 is displaced (e.g., coiled). Again, the pressure reading mechanism 106 detects the displacement of the pressure gauge 102 and converts the displacement to a pressure measurement.

Similarly, when the pressure gauge 102 is a helix (or a spiral), the application of pressure will induce the helix to unwind. The unwinding or displacement resulting from the unwinding is converted to the pressure measurement. In addition, when the pressure gauge 102 is a bellows, the application of pressure will induce the bellows to expand, resulting in a displacement that is convertible to a pressure measurement. These are merely meant to be illustrative of possible pressure gauges and should not be viewed as limiting of this disclosure.

Advantageously, including the compensator material 128 in the pressure transferring media 124 reduces the propensity of the pressure transferring media 124 to change in volume or expand in response to temperature changes to which the pressure measurement device is exposed. It is to be appreciated that the reduction is proportional to the volume of the compensator material 128 within the pressure transferring media 124 and the cavity 120 of the pressure gauge 102.

As previously mentioned, the volume of the compensator material 128 and the first material 126 are selected to provide a desired overall coefficient of thermal expansion. In some embodiments, the compensator material 128 consumes more of the volume in the pressure gauge 102 than the first material 126. In one embodiment, the compensator material 128 is between 70%-90% of the volume of the pressure transferring media 124. The volume of the first material 126 may be the remainder of the volume of the pressure transferring media 124 not occupied by the compensator material 128. Accordingly, in the embodiment in which the compensator material 128 is a solid, the first material 126 is significant enough in volume to freely flow and reposition within the cavity 120 such that the pressure transferring media 124 does not impede the displacement of the gauge 102. In another embodiment, the volume of the compensator material 128 may also be 80%-90% of the volume of the pressure transferring media 124. The volume of the first material 126 may be the remaining 10%-20% of the volume of the pressure transferring media 124 not occupied by the compensator material 128.

In an embodiment, the compensator material 128 may advantageously have a lower mass than the first material 126. In that regard, the compensator material 128 may improve the shock resistance of the pressure gauge 102. Furthermore, when a material of lower mass is used, the likelihood of bending or deforming the gauge 102, for example, due to a gravitational force, is also reduced.

The first material 126 (and the compensator material 128) may advantageously be materials used in sanitary situations or sterile environments. In the event of a breach of the membrane 104 or the pressure gauge 102, the pressure transferring media 124 may escape the pressure gauge 102 to the environment outside of the pressure gauge 102 (whose pressure is sensed or monitored using the pressure measurement device 100). The environment may be an industrial or a manufacturing facility (such as a food production facility or an industrial paint production facility, among many others). The release of any unsanitary material may compromise the facility, conflict with established hygienic or manufacturing standards, and require significant remediation. However, the release of sanitary or sterile material may be endured without significant remediation.

Reducing the coefficient of thermal expansion of the pressure transferring media (or the propensity of the volume of the pressure transferring media to change in relation to temperature) improves the pressure sensing ability of the gauge 102 and the pressure measurement device 100. Further, reducing the coefficient of thermal expansion of the pressure transferring media decouples pressure measurement from the effects of temperature variation. The impact of temperature on pressure measurement is reduced. The resulting pressure measurement is more accurate, as it is less susceptible to temperature changes.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A pressure measurement device comprising:
   a C-shaped Bourdon tube having a distal end and a proximal end having an open inlet, an interior of the C-shaped Bourdon tube forming a cavity, wherein the cavity expands and contracts in response to changes in temperature;
   a pressure transferring media in the cavity, wherein the pressure transferring media includes a liquid and a compensation material, wherein the compensation material is selected such that a combination of the compensation material and the pressure transferring media at least in part counteracts expansion and contraction of the cavity in response to changes in temperature;
   a membrane positioned to cover the open inlet, the membrane having a first surface that interfaces with the cavity of the C-shaped Bourdon tube and a second surface opposite the first surface that is exposed to an environment outside of the C-shaped Bourdon tube; and
   a pressure reading mechanism coupled to the distal end of the C-shaped Bourdon tube and operative to convert displacement of the distal end to a pressure measurement reading.

2. The pressure measurement device of claim 1, wherein the liquid occupies between 10% and 30% of the volume of the cavity and the compensator material occupies a remaining volume of the cavity.

3. The pressure measurement device of claim 2, wherein the combination of the compensation material and the pressure transferring media at least in part counteract the expansion of the cavity over a particular temperature range.

4. The pressure measurement device of claim 3, wherein the particular temperature range is between −50° F. and 400° F.

5. The pressure measurement device of claim 4, wherein the particular temperature range is between 0° F. and 150° F.

6. The pressure measurement device of claim 1, wherein the C-shaped Bourdon tube is made of metal, wherein the liquid has a first coefficient of thermal expansion and the compensation material has a second coefficient of thermal expansion, wherein the second coefficient of thermal expansion is less than the first coefficient of thermal expansion.

7. The pressure measurement device of claim 6, wherein the compensation material is at least one of: Garolite®, ceramic, glass, Invar™, or graphite.

8. The pressure measurement device of claim 1, wherein the C-shaped Bourdon tube is made of a first plastic material, wherein the liquid has a first coefficient of thermal expansion and the compensation material has a second coefficient of thermal expansion, wherein the second coefficient of thermal expansion is greater than the first coefficient of thermal expansion.

9. The pressure measurement device of claim 8, wherein the compensation material is made of a second plastic material, wherein the second plastic material has a coefficient of thermal expansion that is greater than the first plastic material.

10. The pressure measurement device of claim 9, wherein the liquid is at least one of silicone, mineral oil, or water.

11. A pressure measurement device comprising:
    a pressure gauge having a cavity, the pressure gauge being made of a material having a first coefficient of thermal expansion;
    a pressure transferring media in the cavity, wherein the pressure transferring media includes a first material and a second material, wherein the first and second materials together have an overall coefficient of thermal expansion that at least in part counteract expansion and contraction of the cavity in response to changes in temperature; and a pressure reading mechanism coupled to the pressure gauge and operative to convert a displacement of the pressure gauge to a pressure measurement reading.

12. The pressure measurement device of claim 11, comprising:

an inlet in the pressure gauge; and a membrane positioned to cover the inlet, the membrane having a first surface that interfaces with the cavity and a second surface opposite the first surface that is exposed to an environment outside of the cavity, the inlet being operative to convey a pressure of the environment to the pressure transferring media, wherein the pressure gauge is at least one of a C-shaped Bourdon tube, a helix, bellows and a diaphragm.

13. The pressure measurement device of claim 11, wherein the overall coefficient of thermal expansion is within 20% of the first coefficient of thermal expansion.

14. The pressure measurement device of claim 11, wherein the first material has a second coefficient of thermal expansion, wherein the second material has a third coefficient of thermal expansion, and wherein the third coefficient of thermal expansion is less than both the second coefficient of thermal expansion and the first coefficient of thermal expansion.

15. The pressure measurement device of claim 11, wherein the first material has a second coefficient of thermal expansion, wherein the second material has a third coefficient of thermal expansion, and wherein the third coefficient of thermal expansion is greater than both the second coefficient of thermal expansion and the first coefficient of thermal expansion.

16. The pressure measurement device of claim 11, wherein the pressure gauge is made of a metal material, wherein the first material is at least one of silicone, mineral oil, or water, and wherein the second material is Garolite®, graphite, ceramic, glass, or Invar™.

17. A pressure measurement device comprising:

a pressure gauge having a cavity, the pressure gauge being made of a material having a coefficient of thermal expansion;

a pressure transferring media in the cavity, wherein the pressure transferring media includes a first material and a second material, wherein the first material and the second material have an overall coefficient of thermal expansion such that the pressure transferring media expand and contract in volume at least in part to counteract expansion and contraction of the cavity in response to changes in temperature over a particular temperature range; and a pressure reading mechanism coupled to the pressure gauge and operative to convert a displacement of the pressure gauge to a pressure measurement reading.

18. The pressure measurement device of claim 17, wherein the overall coefficient of thermal expansion is within 10% of the coefficient of thermal expansion of the pressure gauge.

19. The pressure measurement device of claim 17, wherein the overall coefficient of thermal expansion is determined based on type of materials and quantities of the first material and the second material.

20. The pressure measurement device of claim 17, wherein the coefficients of thermal expansion of the material of the pressure gauge and the second material are greater than a coefficient of thermal expansion of the first material.

21. The pressure measurement device of claim 17, wherein the coefficients of thermal expansion of the material of the pressure gauge and the second material are less than a coefficient of thermal expansion of the first material.

* * * * *